(12) United States Patent
Gautreau

(10) Patent No.: US 6,898,985 B1
(45) Date of Patent: May 31, 2005

(54) METHOD OF DETERMINING THE NORMAL EVAPORATION RATE (NER) AND VACUUM QUALITY OF A CRYOGENIC LIQUID CONTAINER

(75) Inventor: Ernie Gautreau, Gonzales, LA (US)

(73) Assignee: Cryo-Safe Products, Inc., Gonzales, LA (US)

( * ) Notice: Subject to any disclaimer, the term of this patent is extended or adjusted under 35 U.S.C. 154(b) by 0 days.

(21) Appl. No.: 10/397,796

(22) Filed: Mar. 25, 2003

(51) Int. Cl.[7] .................................................. G01F 1/22
(52) U.S. Cl. ..................................... 73/861.57; 62/45.1
(58) Field of Search ................. 73/861.57; 62/45.1–48.1

(56) References Cited

U.S. PATENT DOCUMENTS

| | | | | |
|---|---|---|---|---|
| 3,864,928 A | * | 2/1975 | Eigenbrod | 62/48.1 |
| 4,287,720 A | * | 9/1981 | Barthel | 62/45.1 |
| 4,394,929 A | * | 7/1983 | Patel et al. | 220/560.12 |
| 4,481,779 A | * | 11/1984 | Barthel | 62/46.3 |
| 4,664,146 A | * | 5/1987 | Carter | 137/599.05 |
| 4,918,927 A | * | 4/1990 | Eigenbrod | 62/45.1 |

* cited by examiner

*Primary Examiner*—Edward Lefkowitz
*Assistant Examiner*—Takisha Miller
(74) *Attorney, Agent, or Firm*—Cryo-Safe Products, Inc.

(57) ABSTRACT

A method of determining the NER and vacuum quality of a cryogenic liquid container that includes the steps of providing a flow gauge having a scale provided thereon adjacent a flow volume indicator ball that is selected to provide an NER value in pounds per day lost directly from the position of the indicator ball.

1 Claim, 4 Drawing Sheets

CRYOGENIC LIQUID CONTAINER
(10)

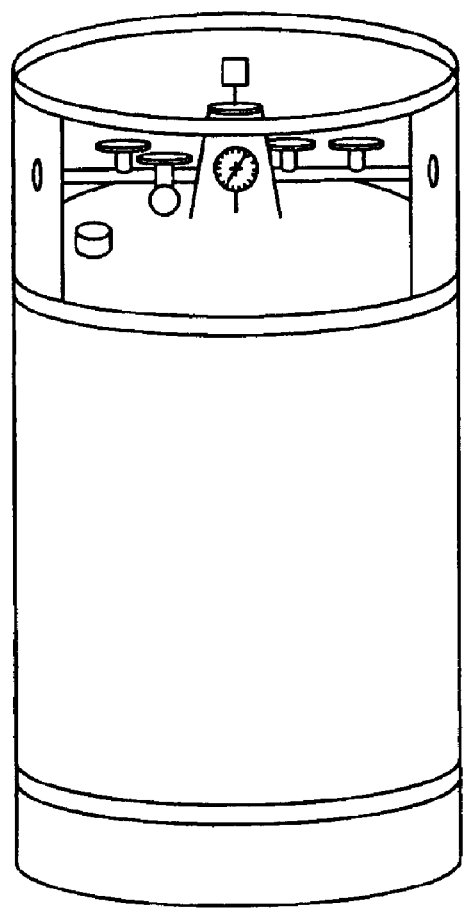
CRYOGENIC LIQUID CONTAINER
(10) FIG.1

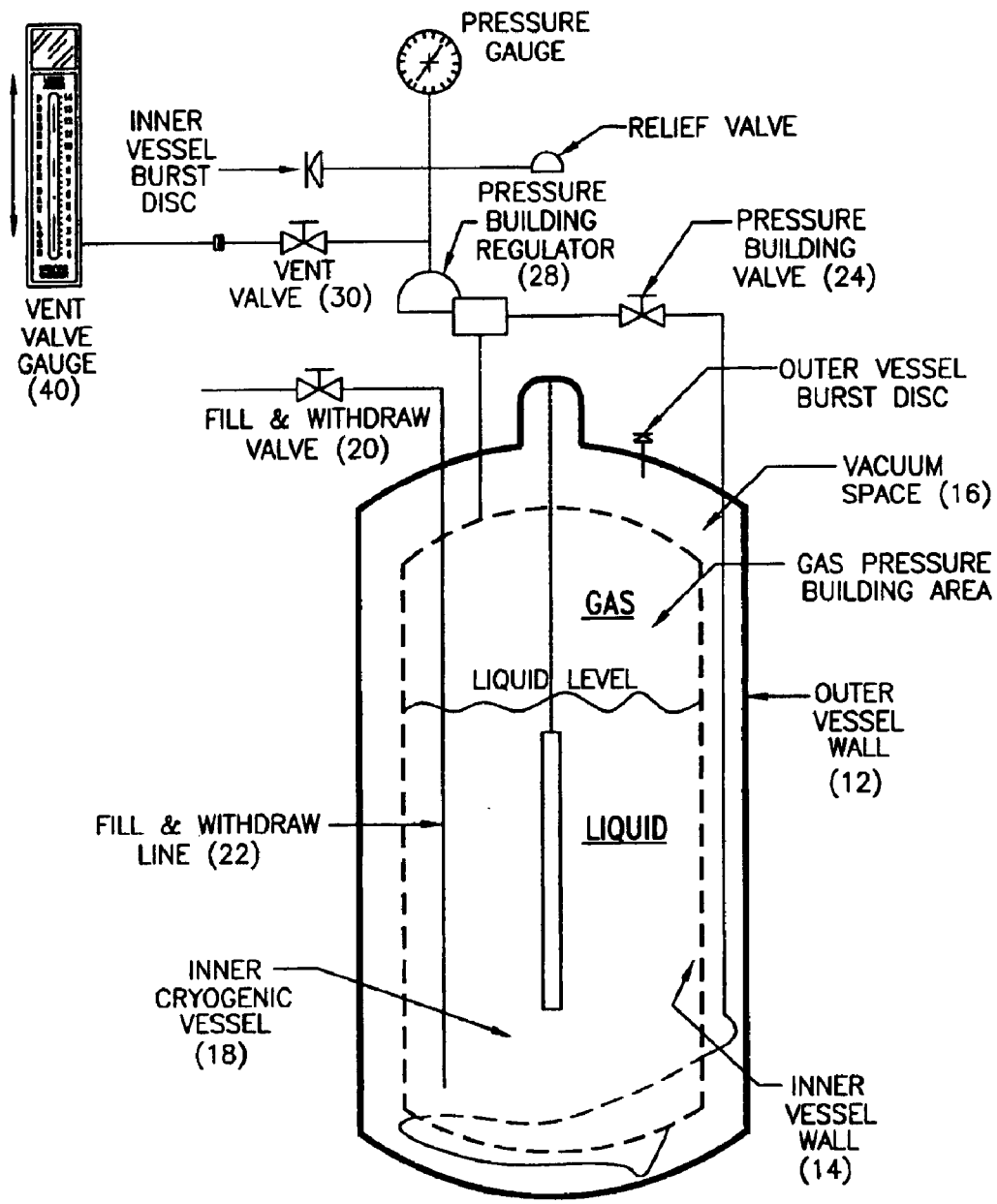
CRYOGENIC LIQUID CONTAINER
(10) FIG.2

LIQUID ARGON

"NER/Vac Checker" Info Card

Cryogenic Liquid Cylinder
Vacuum Quality Indicator

| Make/Model | *NER/Vac |
|---|---|
| Average Low Pressure (DOT4L-100) | N/A |
| Average Medium Pressure (DOT4L-200) | 6.0 - 8.0 |
| Average High Pressure (DOT4L-292) | 6.5 - 8.5 |

| Specific Makes/Models | *NER/Vac |
|---|---|
| Chart-MVE DuraCyl Series (MP) | 7.4 |
| Chart-MVE DuraCyl/Max Series (HP) | 7.5 |
| Taylor-Wharton XL Series (MP) | 6.7 |
| Taylor-Wharton XL Series (HP) | 7.1 |
| Linde/UC/TW PGS/GP-45 (MP) | 7.8 |
| MVE VGL-160 (MP) | 7.6 |
| CSI/MVE PLC-180 (MP) | 7.2 |

(Other Specific Makes/Models Available Upon Request)
*NER/Vac Values Listed Represent Averaged Ideal NER/Vacuum Values 'As Published' based on Useable Liquid Storage Capacities.

Vacuum Quality Interpretation Scale

(59)    Fig. 3

FRONT VIEW

SIDE VIEW

METHOD OF DETERMINING THE NORMAL EVAPORATION RATE (NER) AND VACUUM QUALITY OF A CRYOGENIC LIQUID CONTAINER

TECHNICAL FIELD

The present invention relates to cryogenic liquid container testing methods and equipment and more particularly to a method of determining the normal evaporation rate (NER) and vacuum quality of a cryogenic liquid container containing a known cryogenic liquid product and having a gas vent valve outlet, (of course a variety of other valves may be included in any cryogenic liquid container with which this method is meant to be practiced, the method including the steps of: a) providing a vent valve outlet gauge having a product specific NER scale positioned adjacent to a gas flow tube, the gas flow tube having a flow indicator ball moveably entrapped therein such that the position of the flow indicator ball with respect to the product specific NER scale indicates the NER of the cryogenic liquid container being tested, the gas flow tube having an inlet connectable to a gas vent valve outlet of an open gas vent valve of the cryogenic liquid container and an outlet open to the atmosphere such that the volume of gas generated by the evaporation the liquid product leaving the gas vent valve outlet passes through the gas flow tube lifting the flow indicator ball to a level corresponding to the NER, measured in pounds per day of liquid product lost, is read directly from the adjacent product specific NER scale; b) connecting the inlet of the gas flowtube to the gas vent valve outlet of the open gas vent valve of the cryogenic liquid container to be tested; c) providing a product specific, vacuum quality interpretation scale that corresponds with the product specific NER scale of the specific liquid product; and d) determining the vacuum quality of the cryogenic liquid container being tested by comparing the valve of the NER indicated by the vent valve outlet gauge with the provided product specific vacuum quality interpretation scale to obtain a vacuum quality value.

BACKGROUND ART

The vacuum quality of cryogenic liquid containers that use a vacuum between an outer wall and an, inner cryogenic liquid container wall are typically tested by filling the cryogenic liquid container with a specific liquid product. The inner cryogenic liquid container typically has a portion thereof filled with the liquid and a gas area filled with the product in a gaseous state at a pressure selected either by the selection of or the adjustment of gas vent valve that has a vent inlet into a top of the gas area of the inner cryogenic container to prevent the pressure within the gas area from exceeding the set or selected value. With the gas vent valve remaining in the open condition, the cryogenic liquid container is then allowed to reach thermal equilibrium, usually by waiting a period of time between twelve and twenty-four hours. The cryogenic liquid container is then physically lifted onto a scale, usually by a fork lift or gantry crane, to obtain an first container weight (the weight of the cryogenic liquid container and the weight of the liquid product remaining after the liquid product within cryogenic liquid container reaches thermal equilibrium). The cryogenic liquid container is then removed from the scale and placed in a stable ambient temperature environment for several days with the gas vent valve in the normal open condition. After several days, the cryogenic liquid container is placed back on the scale and a second weight is obtained (the weight of the container and the weight of the liquid product within the cryogenic liquid container that has not evaporated during the period the cryogenic liquid container remained in the stable ambient temperature environment for several days). The NER is then determined in pounds per day loss of the liquid product by subtracting the second weight from the first weight and then dividing the result by the number of days between the first weight measurement and the second weight measurement. The determined pounds per day loss, NER, of the liquid product is then compared against a vacuum quality interpretation scale to determine the vacuum quality of the cryogenic liquid container. Because the above described typical method takes a long time and often requires the use of expensive lifting equipment to lift and move the cryogenic liquid container multiple times, it would be desirable to have a simple, less expensive, safe method for rapidly and reliably determining the pounds per day loss value used to obtain the NER of the liquid product as well as the vacuum quality of the cryogenic liquid container.

GENERAL SUMMARY DISCUSSION OF INVENTION

It is thus an object of the invention to provide a method of determining the NER and vacuum quality of a cryogenic liquid container containing a known cryogenic liquid product and having a gas vent valve outlet, the method including the steps of: a) providing a vent valve outlet gauge having a product specific NER scale positioned adjacent to a gas flow tube thereof, the gas flow tube having a flow indicator ball moveably entrapped therein such that the position of the flow indicator ball with respect to the product specific NER scale indicates the NER of the cryogenic liquid container being tested, the gas flow tube having an inlet connectable to a gas vent valve outlet of an open gas vent valve to a gas vent valve outlet of the cryogenic liquid container and an outlet open to the atmosphere such that the volume of gas leaving the gas vent valve outlet passes through the gas flow tube lifting the flow indicator ball to a level corresponding to the volume of gas flow such that the NER in pounds per day of liquid product lost is read directly from the adjacent product specific NER scale; b) connecting the inlet of the gas flow tube to the gas vent valve outlet of the cryogenic liquid container to be tested; c) providing a product specific, vacuum quality interpretation scale that corresponds with the product specific NER scale of the vent valve outlet gauge; and d) determining the vacuum quality of the cryogenic liquid container being tested by comparing the NER indicated by the flow indicator ball with respect to the provided product specific, vacuum quality interpretation scale to obtain a vacuum quality value.

Accordingly, a method of determining the NER and vacuum quality of a cryogenic liquid container is provided. The method of determining the NER and vacuum quality of a cryogenic liquid container containing a known cryogenic liquid product and having a gas vent valve outlet includes the steps of: a) providing a vent valve outlet gauge having a product specific NER scale positioned adjacent to a gas flow tube thereof, the gas flow tube having a flow indicator ball moveably entrapped therein such that the position of the flow indicator ball with respect to the product specific NER scale indicates the NER of the cryogenic liquid container being tested, the gas flow tube having an inlet connectable to a gas vent valve outlet of an open gas vent valve to a gas vent valve outlet of the cryogenic liquid container and an outlet open to the atmosphere such that the volume of gas leaving the gas vent valve outlet passes through the gas flow tube lifting the flow indicator ball to a level corresponding to the volume of gas flow such that the NER in pounds per day of liquid product lost is read directly from the adjacent product specific NER scale; b) connecting the inlet of the, gas flow tube to the gas vent valve outlet of the cryogenic liquid container to be tested; c) providing a product specific, vacuum quality interpretation scale that corresponds with the product specific NER scale of the vent valve outlet gauge; and d) determining the vacuum quality of the cryogenic liquid container being tested by comparing the NER indicated by the flow indicator ball with respect to the provided product specific, vacuum quality interpretation scale to obtain a vacuum quality value.

The method outlined and described in the disclosure is suitable for a variety of liquid products including, but not limited to, liquid oxygen; liquid argon; liquid nitrogen; liquid helium, and liquid hydrogen.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 1 is a perspective view of a representative cryogenic liquid container that is testable using the method of determining the NER and vacuum quality of a cryogenic liquid container of the present invention.

FIG. 2 is a schematic view of the representative cryogenic liquid container of FIG. 1 along with an exemplary embodiment of a vent valve outlet gauge used in an exemplary method of the invention.

FIG. 3 is a plan view of an exemplary product specific, vacuum quality interpretation scale that corresponding with the product specific NER scale of the vent valve outlet gauge of FIG. 2.

EXEMPLARY MODE FOR CARRYING OUT THE INVENTION

Figure 4:
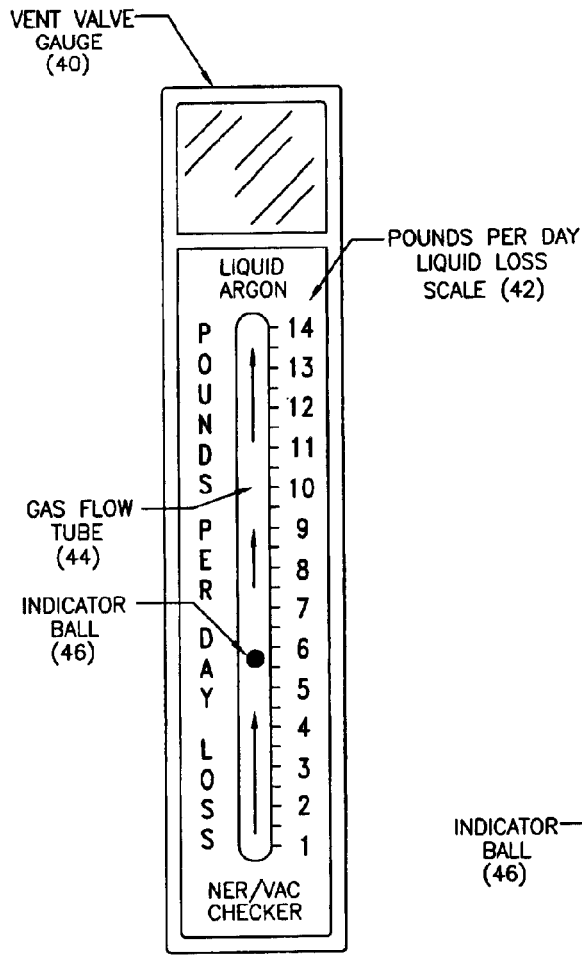
FIG. 4 is a front plan view of an exemplary embodiment of an exemplary vent value outlet gauge used in an exemplary embodiment of the method of the invention showing a product specific NER scale positioned adjacent to a gas flow tube of the vent valve outlet gauge; the gas flow tube having a flow indicator ball moveably entrapped therein such that the position of the flow indicator ball with respect to the product specific NER scale indicates the NER of the cryogenic liquid container being tested; in the exemplary method, the NER of the cryogenic liquid container, indicated by the flow indicator ball, being compared with a product specific, vacuum quality interpretation scale corresponding with the product specific NER scale to provide the user with the vacuum quality of the cryogenic liquid container being tested by the method of the invention.
Figure 5:
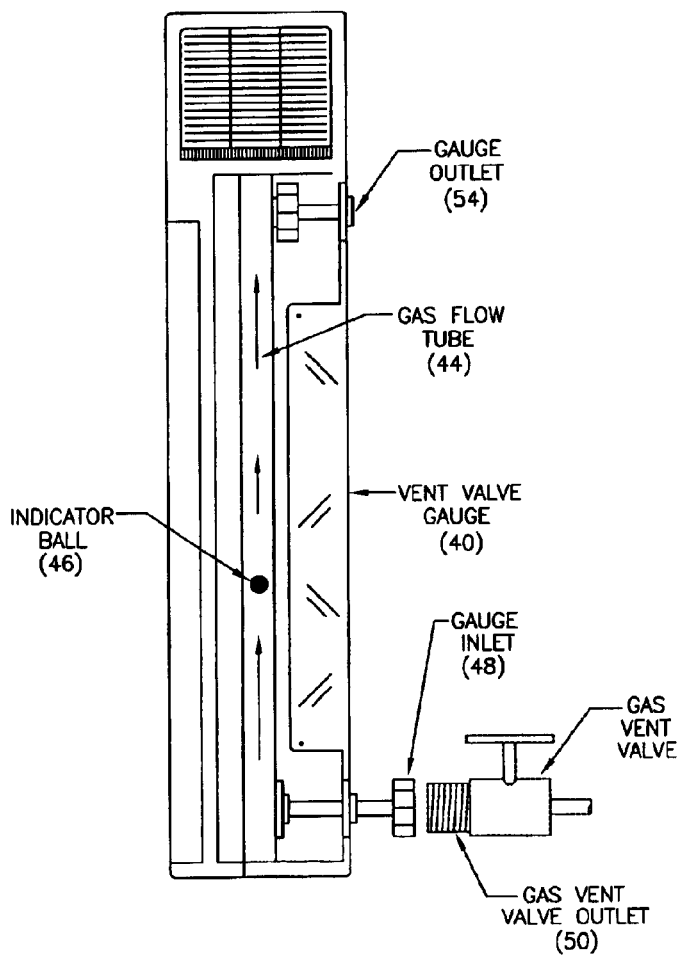
FIG. 5 is a side plan view of the exemplary vent valve outlet gauge of FIG. 4.

FIGS. 1–5 show various aspects of exemplary embodiments of the method of determining the NER and vacuum quality of a cryogenic liquid container, generally designated 10.

Cryogenic liquid container 10 includes an outer vessel wall 12 surrounding an inner vessel wall 14 to form a vacuum space 16 used to insulate an inner cryogenic vessel 18 formed by inner vessel wall 14. Cryogenic liquid container 10 also includes a product fill and withdraw valve 20 connected to a product fill and withdraw line 22 extending to the bottom of inner cryogenic vessel 18. Pressure for forcing the cryogenic liquid from the inner cryogenic vessel 18 is generated in the upper area of inner cryogenic vessel 18, by opening a pressure building valve 24 to allow cryogenic liquid product from cryogenic vessel 18 to flow through a tube to expose a portion of the cryogenic liquid product to ambient temperatures sufficient for the portion of cryogenic liquid product to turn into a high pressure gas which is then fed back into the top pressurized area of cryogenic vessel 18. A pressure building regulator 28 maintains the selected pressure in the top pressurized area of cryogenic vessel 18 during usage. During storage, the product fill and withdraw valve 20 and the pressure building valve 24 are in the closed condition. These are the valve conditions used during testing of the cryogenic liquid container 10. Except for the vent valve 30 which is put in the open condition.

The method of determining the NER and vacuum quality of a cryogenic liquid container 10 of the present invention includes the steps of: a) providing a vent valve outlet gauge having a product specific NER scale 42 positioned adjacent to a gas flow tube 44. The gas flow tube 44 has a flow indicator ball 46 moveably entrapped therein such that the position of the flow indicator ball 46 with respect to the product specific NER scale 42 indicates the NER of the cryogenic liquid container 10 being tested, the gas flow tube 44 having an inlet 48 that is connectable to a gas vent valve outlet 50 of cryogenic liquid container 10 once the cryogenic liquid product in cryogenic liquid container 10 has reached an equilibrium state and an outlet 54 open to the atmosphere such that the volume of gas leaving the gas vent valve outlet 54 passes through the gas flow tube 44 lifting the flow indicator ball 46 to a level adjacent to the NER scale 42 to indicate the NER value in pounds per day of liquid product lost; b) connecting the inlet 48 of the gas flow tube 44 to the gas vent valve outlet 50 of the cryogenic liquid container 10 to be tested; c) providing a product specific, vacuum quality interpretation scale 59 that corresponds with the product specific NER scale 42 of the product specific vent valve outlet gauge 40; and d) determining the vacuum quality of the cryogenic liquid container 10 being tested by comparing the NER indicated by the position of the flow indicator ball 46 with the provided product specific, vacuum quality interpretation scale 59 to obtain a vacuum quality value.

It can be seen from the preceding description that a method of determining the NER and vacuum quality of a cryogenic liquid container has been provided. It should be understood that different cryogenic liquid products will utilize different scales.

It is noted that the embodiment of the method of determining the NER and vacuum quality of a cryogenic liquid container described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A method of determining the NER and vacuum quality of a cryogenic liquid container containing a known cryogenic liquid product and having a gas vent valve outlet, the method comprising the steps of:

a) providing a vent valve outlet gauge having a product specific NER scale positioned adjacent to a gas flow tube thereof, the gas flow tube having a flow indicator ball moveably entrapped therein such that the position of the flow indicator ball with respect to the product specific NER scale indicates the NER of the cryogenic liquid container being tested, the gas flow tube having an inlet connectable to a gas vent valve outlet of an open gas vent valve to a gas vent valve outlet of the cryogenic liquid container and an outlet open to the atmosphere such that the volume of gas leaving the gas vent valve outlet passes through the gas flow tube lifting the flow indicator ball to a level corresponding to the volume of gas flow such that the NER in pounds per day of liquid product lost is read directly from the adjacent product specific NER scale;

b) connecting the inlet of the gas flow tube to the gas vent valve outlet of the cryogenic liquid container to be tested;

c) product specific, vacuum quality interpretation scale that corresponds with the product specific NER scale of the vent valve outlet gauge; and d) determining the vacuum quality of the cryogenic liquid container being tested by comparing the NER indicated by the flow indicator ball with respect to the provided product specific, vacuum quality interpretation scale to obtain a vacuum quality value.

* * * * *